United States Patent [19]
Duthoo

[11] Patent Number: 5,808,271
[45] Date of Patent: Sep. 15, 1998

[54] METHOD OF LASER BEAM WELDING INTERLACED STRAPS OF A SPACER GRID WITH PLURAL BEAMS

[75] Inventor: Dominique Duthoo, Romans, France

[73] Assignee: Franco-Belge de Fabrication de Combustible—FBFC, Courbevoie, France

[21] Appl. No.: 674,262

[22] Filed: Jul. 1, 1996

[30] Foreign Application Priority Data

Jun. 29, 1995 [FR] France ................................ 95 07861

[51] Int. Cl.⁶ .................................................. B23K 26/00
[52] U.S. Cl. ................................ 219/121.64; 219/121.76
[58] Field of Search ......................... 219/121.63, 121.64, 219/121.76, 121.77, 121.85, 121.86; 976/DIG. 81

[56] References Cited

U.S. PATENT DOCUMENTS

| | | | |
|---|---|---|---|
| 4,636,606 | 1/1987 | Chastanet et al. | 219/121.63 |
| 4,825,032 | 4/1989 | Duncan | 219/121.63 |
| 5,221,515 | 6/1993 | Thiebaut et al. | 219/121.64 X |
| 5,369,242 | 11/1994 | Hatfield et al. | 219/121.63 |

FOREIGN PATENT DOCUMENTS

| | | |
|---|---|---|
| 0 088 021 A1 | 9/1983 | European Pat. Off. . |
| 0 104 119 A1 | 3/1984 | European Pat. Off. . |
| 0 305 944 A1 | 3/1989 | European Pat. Off. . |
| 0372786 | 6/1990 | European Pat. Off. .......... 219/121.63 |
| 0 456 577 A1 | 11/1991 | European Pat. Off. . |
| 58-168488 | 10/1983 | Japan ............................... 219/121.63 |
| 60-223693 | 11/1985 | Japan ............................... 219/121.63 |
| 1-169396 | 7/1989 | Japan ............................... 219/121.64 |
| 5-52980 | 3/1993 | Japan ............................... 219/121.64 |

OTHER PUBLICATIONS

Patent Abstracts of Japan, vol. 10, No. 83, Apr., 1986, "Welding Device For Nuclear Fuel Spacer", JP. 60–223693.

*Primary Examiner*—Philip H. Leung
*Assistant Examiner*—Gregory L. Mills

[57] ABSTRACT

The spacer grid (20) is placed and held during welding in an arrangement such that its two opposite faces perpendicular to the edges (33) of the cells (34) are entirely accessible. At least four edge segments (33) of the grid (20) are welded simultaneously using two assemblies with at least two laser beam welding devices (25a, 25b, 25d) arranged on either side of the opposite faces of the spacer grid (20). Each of the welding devices directs a welding laser beam onto an edge (33) of the grid, via the exterior of the cells (34). After a welding operation, a relative displacement between the spacer grid (20) and the welding devices (25a, 25b, 25d) is produced so as to direct the welding laser beams (30a, 30b) of the welding device to at least four new edge segments (33) of the grid (20).

3 Claims, 4 Drawing Sheets

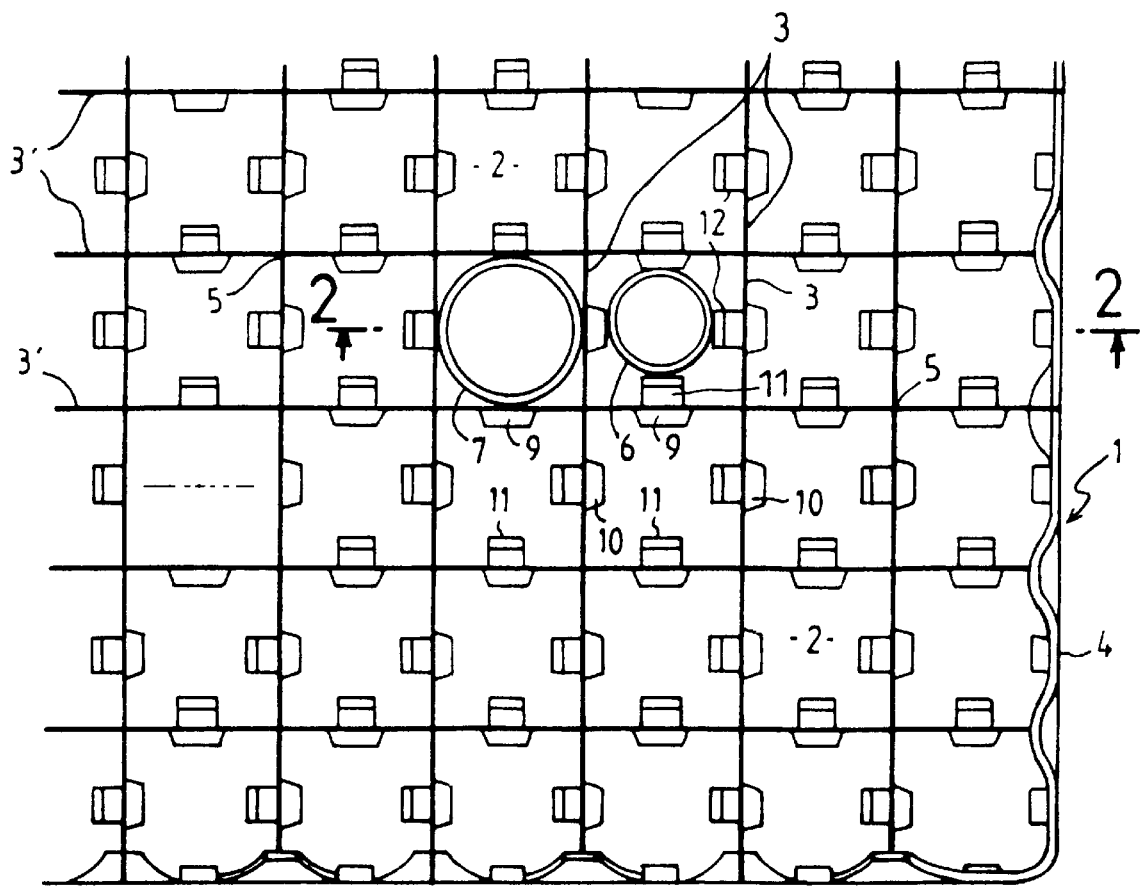
FIG.1
FIG.2
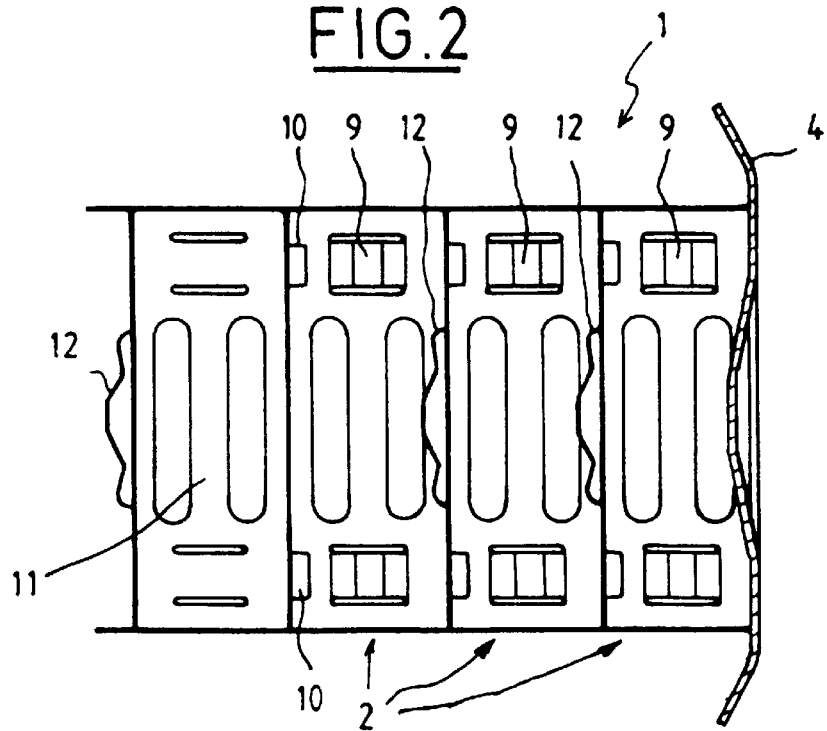

METHOD OF LASER BEAM WELDING INTERLACED STRAPS OF A SPACER GRID WITH PLURAL BEAMS

FIELD OF THE INVENTION

The invention relates to a method for welding interlaced metal straps of a spacer grid of a fuel assembly for a nuclear reactor, via the exterior of the grid.

BACKGROUND OF THE INVENTION

Fuel assemblies for a nuclear reactor and, in particular, for nuclear reactors cooled by pressurized water, comprise a bundle of long cylindrical fuel elements, called rods, which are held inside a framework of the fuel assembly in an arrangement in which the rods are all mutually parallel.

The framework of the fuel assembly includes spacer grids comprising cells arranged in a regular network intended to hold the rods of the fuel assembly transversely. Guide tubes, which are longer than the fuel rods, are engaged in some of the cells in the spacer grids. End nozzles fixed on the ends of the guide tubes stiffen the framework and retain the fuel rods.

The spacer grids are distributed at regular intervals along the length of the guide tubes.

The spacer grids include prismatically shaped cells, which are most often parallelepipedal and of square cross-section, and which are intended to receive either a fuel rod or a guide tube of the framework.

The spacer grids generally consist of interlaced metal straps arranged along two directions at 90° and defining parallelepipedally shaped cells of square cross-section intended to receive the fuel rods and the guide tubes of the assembly. Each of the straps of the network, which has square repeat units, constituting the spacer grid intersects all the straps arranged in a direction at 90° C. with respect to the strap. Each of the intersections of two straps constitutes a cross-brace having four 90° dihedral angles and a junction edge common to four cells of the grid. The straps are assembled by interlocking and then welding along the junction edges common to four cells of the grid.

In order to assemble the straps constituting a cross-brace along one edge, the straps are generally engaged with one another by means of a slot occupying half the width of the strap.

The grid is first assembled by engaging the straps with one another in the grid network, which has square repeat units, and by assembling the peripheral belt of the grid with the ends of the straps. The straps are then welded onto one another at the crossover points of the straps at the end of each of their junction edges, and the peripheral belt which closes the peripheral cells of the grid is then welded. The size of the cells of the spacer grids is such that the fuel rods are engaged with fairly large clearance inside the cells. Holding means which project into each of the cells are used for holding the fuel rods inside the cells of the grid. These holding means may consist of dimples obtained by cutting and pushing into the cells the metal of the straps and by springs, which can be attached onto the cell walls consisting of parts of the straps or are formed by cutting and pushing in the metal of these straps.

The guide tubes are introduced virtually without clearance into the cells of the spacer grids and can be fixed by welding on some of the grids of the fuel assembly.

In a spacer grid for a fuel assembly of conventional type, each of the cells may, for example, include two sets of two dimples on two adjacent walls, and two springs on two other adjacent walls located facing the dimples. In the cells of such a spacer grid, the fuel rod is pushed by each of the springs onto the two dimples located opposite the spring.

When the spacer grid is mounted and welded, the straps assembled with one another include the dimples and the springs intended to project into each of the cells of the grid. The straps furthermore include other parts which are cut and pushed in, such as tongues or lugs which improve the stiffness and strength of the assembled grid.

It may be necessary and advantageous to weld together the straps of the spacer grid at each of their edges constituting the edge of a cross-brace formed by two strap parts assembled together.

One of the problems encountered when welding the spacer grids of fuel assemblies relates to the heating of the straps due to the welding, which may lead to the appearance of stresses and deformations of the grid.

Various methods have been proposed for successively welding the edges of a spacer grid, making it possible to limit as far as possible the stresses and the deformations suffered by the grid as a result of the heating due to the welding.

For example, a patent application filed on the same day as the present application proposes a spacer grid for a fuel assembly, in which the cross-braces are successively welded along two bisector planes, at 90°, of the dihedra constituting a cross-brace. The successive cross-braces arranged along the length of a strap of the grid include successive welds, along a part of the length of the edge of a cross-brace in the vicinity of one of the faces of the grid, which are directed along a first bisector plane of two dihedra of the cross-brace then, for the following cross-brace, along a second bisector plane of two dihedra of the second cross-brace at 90° with respect to the first.

The welds in the vicinity of the second face of the grid on each of the edges of the cells are located in bisector planes at 90° with respect to the bisector planes in which the welds of the edges in the vicinity of the first face of the grid are made.

Such a method makes it possible to limit greatly the stresses and deformations suffered by the grid during the welding, because of the distribution of the weld lines around a given cell of the grid and at each of the ends of the cell which are located in the vicinity of a face of the grid.

The laser beam welding method is furthermore particularly well-suited to the case of welding of straps which are relatively thin and to welding along the edges of cells which have a small cross-section (for example of the order of (1×1) cm$^2$).

One problem linked with the manufacture of the spacer grids of fuel assemblies relates to the time taken to carry out the welding owing to the very large number of welds to be made.

In the case of the method mentioned above, it is necessary to make four welds along each of the edges of each of the cells, because the welds are made successively in each of the bisector planes of the four dihedra of each of the cross-braces.

For this reason, in the case of a grid which includes 16×16 cross-braces, the number of welds to be made for all the cross-braces in the grid is 4×16×16=1024 welds.

It is therefore necessary to have available a welding method which makes it possible to make the welds in a sequence making it possible to limit the appearance of stresses and deformations in the grid, with the shortest possible total welding time for the grid.

SUMMARY OF THE INVENTION

The object of the invention is therefore to provide a method for welding interlaced metal straps of a spacer grid of a fuel assembly for a nuclear reactor, defining juxtaposed parallelepipedally shaped cells of square cross-section constituting a network in which four adjacent cells have a common edge along which two straps constituting a cross-brace are assembled and welded, the edges of the grid all being mutually parallel and the cells having open ends along two opposite parallel faces of the spacer grid, this method making it possible to carry out welding sequences capable of limiting the heating, the stresses and the deformation suffered by the grid during welding and to produce all the welds of a spacer grid in a short time, and hence at limited cost.

To this end:

the spacer grid is placed and held during welding in an arrangement such that its two opposite faces are entirely accessible, at least four edge segments of the grid are welded simultaneously using two sets of at least two laser welding devices arranged on either side of the opposite faces of the spacer grid so as each to direct a welding laser beam onto an edge of the grid, via the exterior of the cells, and after welding at least four edge segments of the grid, a relative displacement between the spacer grid and the welding devices is produced so as to direct the welding laser beams of the welding devices to at least four new edge segments of the grid.

BRIEF DESCRIPTION OF THE DRAWINGS

In order to explain the invention clearly, a description will now be given, by way of example, with reference to the appended drawing figures, of two embodiments of a welding method according to the invention and a welding device making it possible to implement the method.

FIG. 1 is a plan view of a part of a spacer grid of a fuel assembly for a pressurized water nuclear reactor.

FIG. 2 is a view in vertical section along line 2—2 in FIG. 1.

DESCRIPTION OF PREFERRED EMBODIMENT

Figure 3:
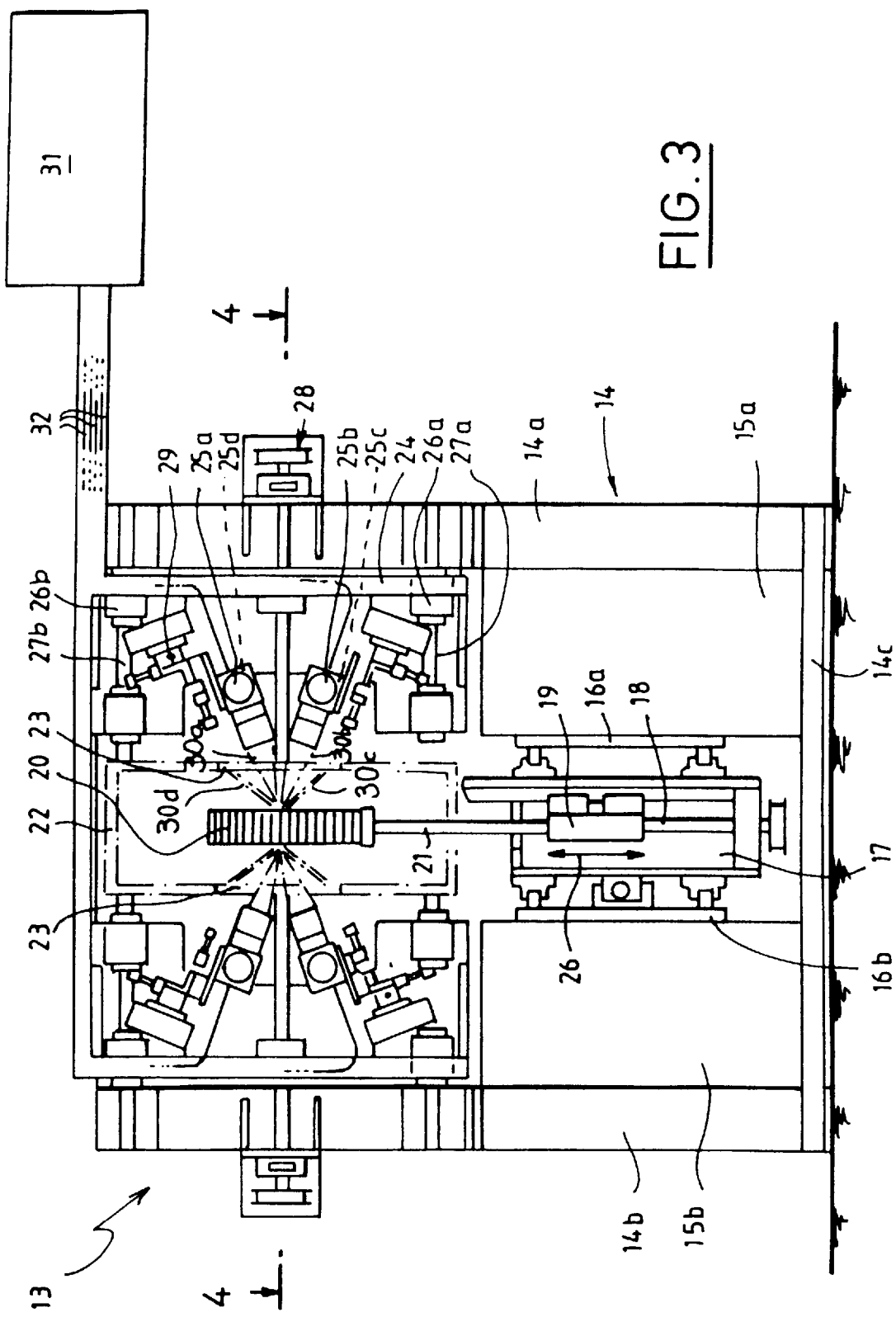
FIG. 3 is a view in vertical elevation and in section of a welding installation making it possible to implement the method according to the invention.

The grid consists of interlaced metal straps, a first set of straps 3, all mutually parallel, having a first direction and a second set of straps 3', all mutually parallel, having a second direction at 90° with respect to the direction of the straps 3. Each of the cells 2 of the grid is defined by two successive straps of the set of straps 3 and two successive straps of the set of straps 3'.

The peripheral cells of the spacer grid include an outer wall consisting of a part of the peripheral belt 4 of the spacer grid. The straps of the sets 3 and 3' include assembly slots whose length is equal to one-half the width of the strap and which are spaced along the length of the strap at a distance corresponding to the side of a cell 2. The straps are assembled together at the parts which include the slots, so that they constitute cross-braces which include four dihedra at 90°, having a common edge 5 constituting an edge common to four parallelepiped shaped cells 2 with square base.

The cells 2 of the grid are intended to receive either a fuel rod 6 or a guide tube 7.

The fuel rods 6 have a diameter substantially less than the side of a cell, so that a clearance is left between the rod 6 introduced into a cell 2 and the walls of the cell which consist of parts of the straps 3 and 3'.

In order to hold the fuel rods inside a cell 2 of the grid, two sets of two stops 9 and 10, arranged on two adjacent walls of the cell 2, are produced by cutting and pushing in two walls of the cell 2.

Two springs 11 and 12 are respectively provided on those walls of the cell 2 arranged opposite the two walls including the stops 9 and 10. As a result, the rod 6 is held in contact against the two sets of stops 9 and 10 by the springs 11 and 12. The springs 11 and 12 can be produced by cutting and pushing in the metal of the walls of the cell 2 or can be attached onto the walls of the cells and fixed by engagement in openings in the walls and welding.

FIGS. 1 and 2 represent a grid including springs produced by cutting and pushing in the metal of the walls of the cells 2. In this case, each of the cell walls includes two oblong slots between which a spring such as 11 or 12 is produced.

The grid 1 as represented in FIGS. 1 and 2 may, heat-treated for example, be an end grid of a fuel assembly made of martensitic steel in which the dimples and the springs are made from the metal of the walls of the grid.

The guide tubes 7, the diameter of which is substantially greater than the diameter of the fuel rods, are introduced virtually without clearance into the cells 2 of the grid. In the case of a lower end grid of a fuel assembly made of martensitic steel, the tubes 7 are fixed on the grid so as to stiffen the framework of the assembly.

Another type of spacer grid for a fuel assembly consists of straps made of a material which is a weak neutron absorber, for example a zirconium alloy. In this case, the dimples are made by cutting and pushing in the zironium alloy walls of the cells of the grid and the springs are treated nickel alloy springs attached onto the walls of the cells.

In all cases, the cross-braces of the grid are welded in the same way, in a welding sequence carried out successively in the various bisector planes of the cross-braces.

One particularly advantageous method for welding the cross-braces of a fuel assembly spacer grid employs a laser beam.

Figure 4:
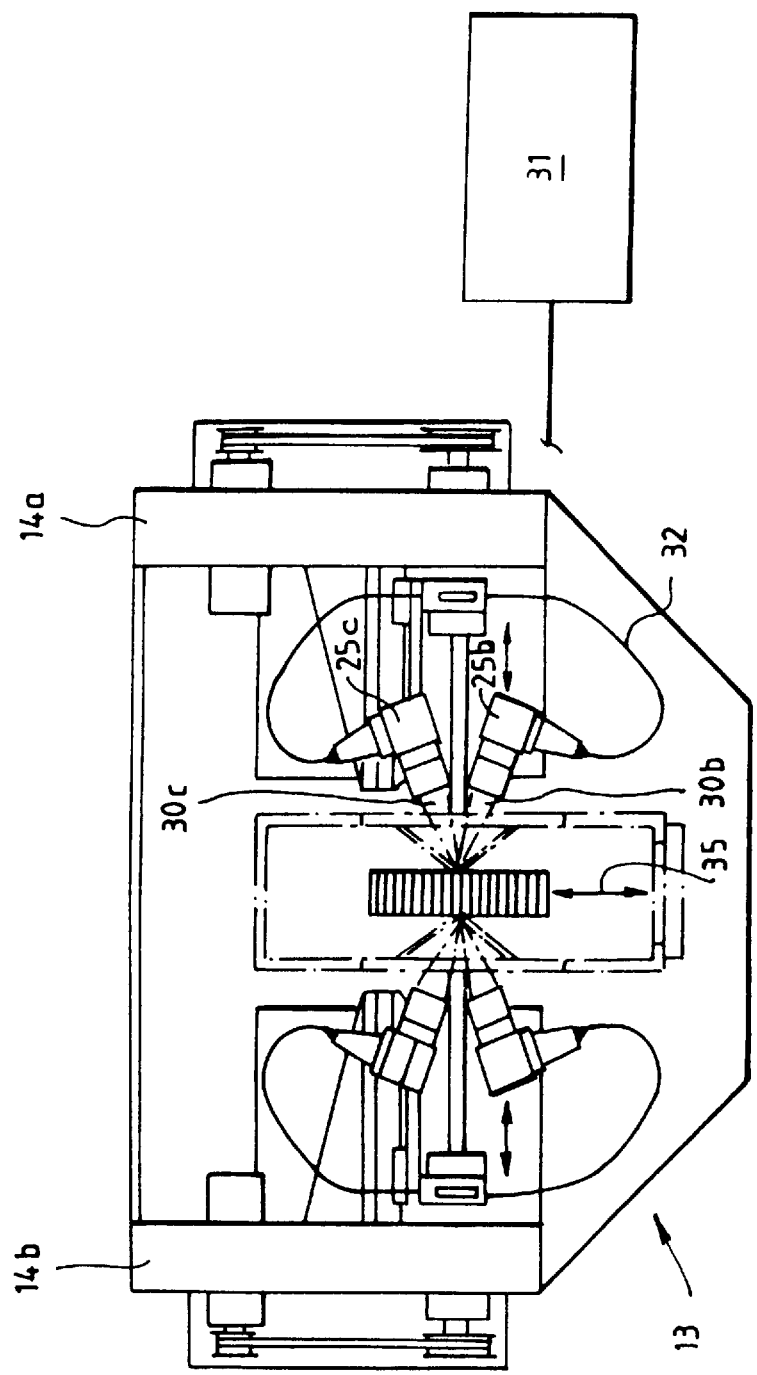
FIG. 4—4 is a view in section along 4 in FIG. 3

FIGS. 3 and 4 represent a welding installation denoted overall by the reference 13 making it possible to implement the method according to the invention.

The welding installation 13 includes a frame 14 consisting of a horizontal support 14c resting on the floor of the welding workshop, and two vertical uprights 14a and 14b. Two vertical supports 15a and 15b on which two guide assemblies 16a and 16b are mounted are fixed on the horizontal support 14c, between the uprights 14a and 14b. These guide assemblies each carry two sets of horizontal rails constituting the guide elements for a carriage 17 including slideways or rollers which engage with the rails in order to allow the carriage 17 to be guided in either direction during horizontal displacements, as schematically represented by the double arrow 35 in FIG. 4.

The carriage may be driven, for example, using a screw parallel to the rails (perpendicular to the plane of FIG. 3) which engages with a nut secured to the carriage 17. A screw and nut device 18, 19 makes it possible to displace the grid 20 fixed on a support secured to the end of a vertical rod 21 sliding in leaktight fashion through the wall of a leaktight enclosure 22 in which an inert gas atmosphere is maintained during the welding.

The grid 20 is fixed on its support at the end of the rod 21, in a position such that its two opposite faces, along which the open ends of the cells of the grid are arranged, are in vertical arrangements parallel to the two opposite faces of the enclosure 22, through which faces transparent windows 23 pass. In this way, the two opposite faces of the grid 20 are accessible on all their surfaces, end the internal part of the cells is accessible via the exterior, through the two opposite faces of the vertically arranged grid. To this end, the grid 20 is arranged on its side, i.e., it rests on its support via its lateral surface consisting of the belt surrounding the grid.

The axes of the cells and the edges of the grid are in a horizontal arrangement perpendicular to the opposite faces of the enclosure 22, in which faces the optical windows 23 are formed.

Four laser beam welding heads are mounted on each of the lateral uprights 14a and 14b of the frame 14 of the welding installation 13, so that the welding heads each emit a welding laser beam which passes through one of the windows 23 to converge on an edge of one of the cells of the grid 20 which is being welded.

The two welding assemblies, each including four welding heads, arranged on either side of the opposite faces of the grid are identical. For this reason only one of the sets of four laser beam welding heads, arranged on the right-hand side in FIGS. 3 and 4 and mounted for movement on the right-hand lateral upright 14a of the frame 14, will be described.

The welding assembly is fixed on a vertical support plate 24 which is mounted for movement in a horizontal transverse direction perpendicular to the faces of the grid, i.e., in a direction parallel to the axes and the edges of the cells of the grid 20. The support plate 24 is secured to linear ball bearings 26a and 26b mounted for sliding movement on transversely directed rods 27a and 27b. A motorized screw and nut assembly 28 makes it possible to displace the support plate 24 in the transverse direction so as to advance the four laser beam welding assemblies simultaneously in the direction of the edges of the grid, in order to carry out the welding along a part of the length of each of the edges. Each of the laser beam welding heads 25a, 25b, 25c and 25d is fixed on a support 29 in a position which is inclined with respect to the faces of the grid and the edges of the cells of the grid, and which can be adjusted before starting the welding operation.

As shown by FIGS. 3 and 4, the inclination of the supports 29 of the various laser beam welding heads is adjusted so that the welding heads such as 25a, 25b, 25c, 25d represented in FIGS. 3 and 4 emit respective welding laser beams 30a, 30b, 30c, 30d which are inclined with respect to the horizontal plane and with respect to a vertical plane. The welding heads are arranged in pairs, substantially symmetrically, with respect to a horizontal plane and with respect to a vertical plane, as is represented in FIGS. 3 and 4.

A power laser source 31 makes it possible to supply power laser radiation, via a bundle of optical fibers 32, to each of the welding heads 25a, 25b, 25c, 25d of a first welding assembly arranged on the right-hand side of the grid, as well as to the set of welding heads arranged, symmetrically with respect to the heads of the first assembly, on the left-hand side of the grid 20.

The welding heads supplied with power laser radiation emit laser beams which are each directed and focused onto a part of an edge of the spacer grid 20, in the vicinity of that face of the grid which faces the corresponding welding assembly.

The welding installation represented in FIGS. 3 and 4 therefore makes it possible to carry out simultaneous welding of eight edge portions of the grid, four of which are arranged in the vicinity of one of the faces of the grid, and the other four of which are arranged in the vicinity of the opposite face of the grid.

In particular, it is possible to use the welding installation which has just been described in order to implement the welding method described above, in which edge portions are welded in the vicinity of the faces of the grid in cell cross-brace bisector planes with an alternating arrangement of the bisector planes along the cell rows and at the ends of a given edge.

To this end, the laser beams 30a, 30b, 30c and 30d produced by the welding heads of the two welding assemblies are directed along bisector planes of the dihedra of the cross-braces of the grid. The laser beam is furthermore focused substantially on the edge of the grid along which the welding is carried out by melting the metal of the straps of the grid.

An advance during the welding along the direction of the edges is obtained by controlled displacement of the supports, 24 of the two sets of welding heads, in the direction of the edges and over a length corresponding to the length of the edge portion on which the welding is carried out.

It is possible to weld simultaneously eight edge portions arranged at the ends of the four edges of the same cell of the grid, or else to weld simultaneously eight edge portions belonging to different cells of the grid, according to the arrangement of the supports 29 of the various welding heads of the two welding assemblies.

The symmetrical arrangement of the welding heads with respect to the opposite faces of the grid and with respect to the network of cells of the grid makes it possible to limit the deformations due to heating of the straps during welding.

Figure 5:
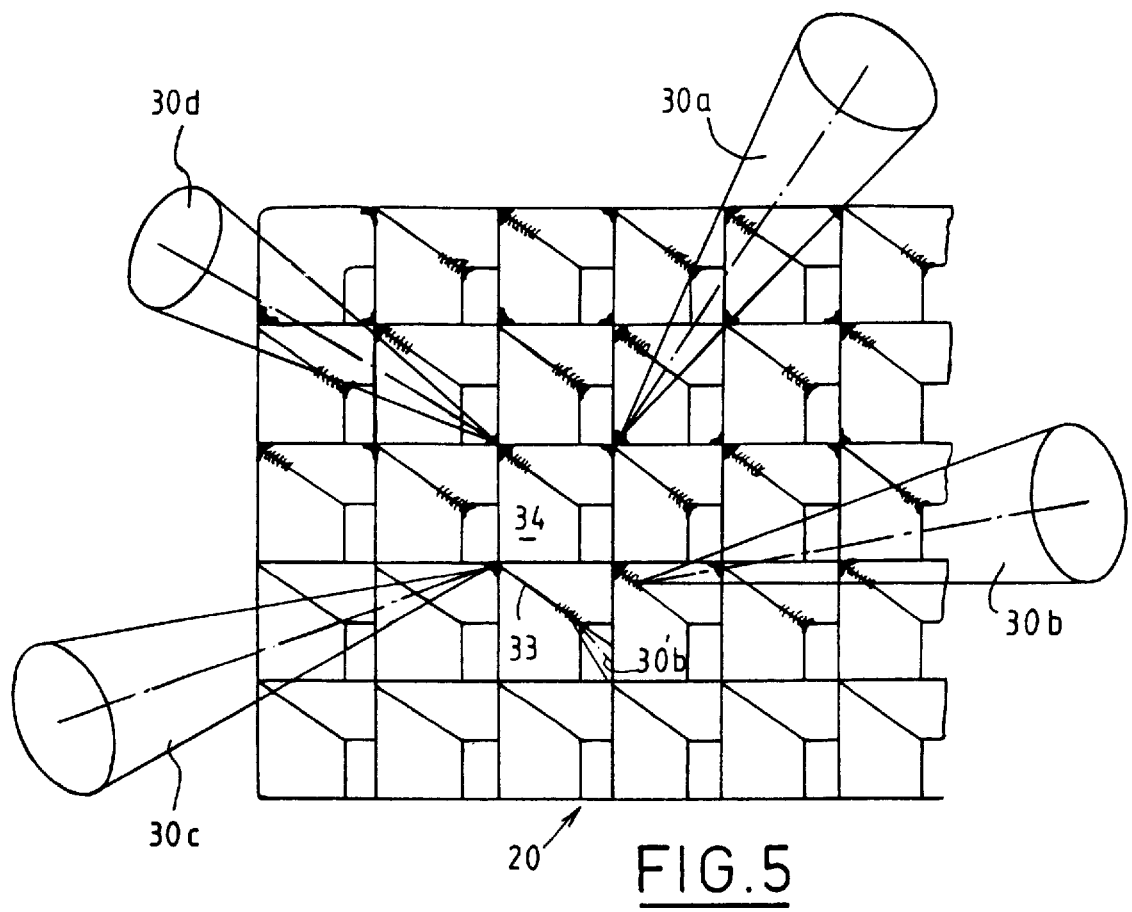
FIG. 5 is a perspective view of a part of the grid during an operation of welding the straps of the grid using a method according to the invention.
Figure 6:
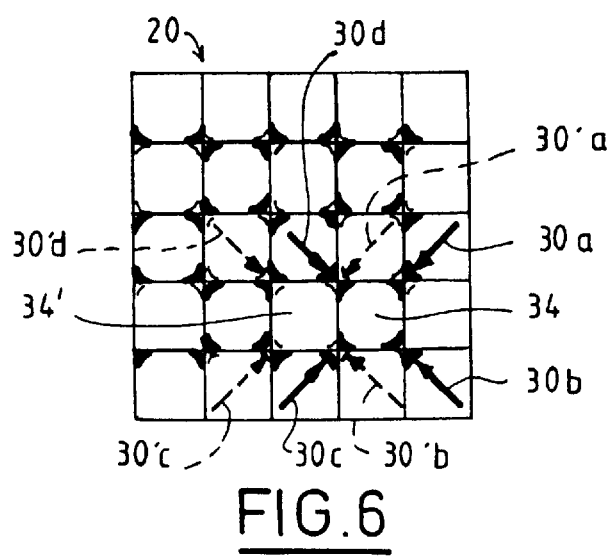
FIG. 6 is a plan view of a part of a spacer grid showing the sequences of grid edge welding by the method according to the invention.

FIGS. 5 and 6 represent a portion of the spacer grid 20 during a phase of a welding operation using the installation represented in FIGS. 3 and 4. The straps of the grid are welded along portions of the edges 33 of the cells along which the straps of the grid 20 are assembled, simultaneously along four edge portions in the vicinity of a first face of the spacer grid and along four edge portions in the vicinity of the second face of the spacer grid 20. The welding is carried out with laser beams directed substantially along the bisector planes of the dihedra of the cross-braces formed by the straps.

As shown by FIG. 5, the four laser welding beams 30a, 30b, 30c, 30d produced by the four welding heads of an assembly arranged on one side of the grid are directed via the exterior of the grid into the four cells surrounding a cell 34 of the grid, along the edges of which a weld is made in a zone adjacent to the face of the grid pointing towards the welding assembly which emits the beams 30a, 30b, 30c and 30d. The beams 30a, 30b, 30c and 30d are directed substantially along the bisector planes common to four dihedra of the cells surrounding the cell 34 and to the four dihedra of the cell 34. The four welding heads of the welding assembly are displaced simultaneously in the direction of the edges 33, so that the laser beams 30a, 30b, 30c and 30d sweep a portion of the edges of the cell 34 between that edge of the grid which points towards the welding assembly and a point located on the edge inside the cell.

The laser beams 30a, 30b, 30c and 30d which simultaneously weld the edges 33 of the cell 34 are all directed along the bisector planes of the dihedra which are opposite the dihedra of the cell 34 and have a common edge with the cell 34. The bisector planes along which the end parts of an edge of the cell 34 are welded are arranged at 90° with respect to one another.

Four welds are produced simultaneously by the first welding assembly arranged in front of the first face of the spacer grid and by the second welding assembly arranged in front of the second face of the spacer grid, opposite the face pointing towards the first welding assembly.

In a plan view of one of the faces of the cell, FIG. 6 represents in the form of unbroken arrows the direction of the welding beams 30a, 30b, 30c and 30d of the first welding assembly and, in the form of broken arrows, the direction of the welding laser beams 30'a, 30'b, 30c' 30'd of the second welding assembly arranged in front of the second face of the spacer grid.

In order to implement the method of welding in the alternate bisector planes of the cells, the set of beams 30'a, 30'b, 30'c, 30'd is offset by one step in the direction of a cell row with respect to the set of beams 30a, 30b, 30c and 30d of the first welding assembly. The beams 30'a, 30'b, 30'c and 30'd make it possible to weld simultaneously four segments of the edges of the cell 34' adjacent to the cell 34, in the vicinity of the second face of the spacer grid.

It would also be possible to weld simultaneously eight edge portions of the same cell by using welding heads of the two laser beam welding assemblies which are oriented so as to emit laser beams in planes arranged at 90° to one another at each of the edges of the cell of the grid.

After having carried out a welding operation on eight edge segments of the cells of the grid, the grid is displaced either horizontally or vertically, in the direction of a cell row, in order to place a new set of eight edge segments of the grid in an arrangement which permits welding along these segments by the eight laser beams emitted by the two welding assemblies placed on either side of the faces of the grid.

In order to obtain an alternating arrangement of the welding directions along the bisector planes of the dihedra of the cells along the cell rows, the grid is displaced, between two welding operations, by two steps corresponding to the side of a cell. All the edges of the grid can thus be welded rapidly.

So as to limit the stresses and therefore the deformations of the straps of the grid during welding, a relative displacement of the grid and of a welding assemblies is carried out, for successive steps, along a path which has the overall shape of a spiral starting from the center of the grid.

The method and the device according to the invention make it possible to weld the edges of the spacer grid rapidly and in fully automatable fashion, and to carry out the welding with a perfectly determined arrangement of the welds in the bisector planes of the dihedra of the cells.

All the welds of the edges of the grid can be made without having to turn the grid over. The weld bead can be produced at any point along an edge of the grid.

The various welding arrangements of the installation may each be supplied by an independent laser source or in group fashion, by means of one or more sources and multiplexer devices.

The welding assemblies arranged on either side of the faces of the spacer grid may be placed so as to weld simultaneously edge portions belonging to identical cells or to different cells of the grid.

It is also possible to use welding assemblies including a number of welding heads other than four. However, in order to obtain sufficient operating speed and to balance the stresses and deformations suffered by the grid, it is necessary to use at least two welding heads emitting two laser beams on to each of the sides of the grid.

The means for displacing the grid with respect to the welding assemblies may be other than the means which have been described.

It is also possible to leave the grid stationary and to displace the welding assemblies from one position to another, between two welding operations.

It is possible to implement the method according to the invention by placing the spacer grid in a position other than the described position on its side. It is, for example, possible to provide grid support means for which engage laterally with the belt of the grid, making it possible to hold the grid in a welding position in which the faces of the grid are not directed along vertical planes but, for example, along horizontal or inclined planes.

The invention applies principally to the welding of any spacer grid for a fuel assembly which includes parallelepipedally shaped cells constituting a network with square repeat units. However, it would also be possible to envisage using the method and the device according to the invention for welding the edges of a grid whose cells are arranged in a network with any shape.

I claim:

1. A method for welding interlaced metal straps of a spacer grid of a fuel assembly for a nuclear reactor defining juxtaposed parallelepiped-shaped cells with square sections, arranged in a network with square repeat units in which a set of four adjacent cells have a common edge along which two straps constituting a cross-brace are assembled and welded, edges of said spacer grid being mutually parallel and the cells having open ends along two opposite parallel faces of said spacer grid, said method comprising the steps of:

(a) placing and holding said spacer grid during welding in an arrangement such that said two opposite faces of said spacer grid are entirely accessible;

(b) welding simultaneously four edge segments of a first cell of said spacer grid in the vicinity of a first face of said spacer grid using a first set of four laser welding devices arranged on a first side of said spacer grid so that each laser welding device of said first set directs a welding laser beam along a bisector plane of a dihedron of said first cell and four edge segments of one of said first cell and a second cell of said spacer grid adjacent to said first cell in the vicinity of a second face of said spacer grid using a second set of four laser welding devices arranged in a second side of said spacer grid, so that each laser welding device of said second set directs a welding laser beam along a bisector plane of the dihedron of one of said first and said second cells of said spacer grid, said laser beams of said welding devices being directed from outside to inside of said first cell and said one cell; and (c) producing, after welding, a relative displacement between said spacer grid and said welding sets so as to direct the welding laser beams of the welding devices of the welding sets to at least four new edge segments on each side of said spacer grid.

2. The method according to claim 1, comprising welding simultaneously four edge segments of said first cell in the vicinity of said first face of said spacer grid and four edge segments of said first cell in the vicinity of said second face of said spacer grid.

3. The method according to claim 1, comprising welding simultaneously, four edge segments of said first cell in the vicinity of said first face of said spacer grid and four edge segments of said second cell in the vicinity of said second face of said spacer grid.

\* \* \* \* \*